United States Patent
Lu et al.

(10) Patent No.: US 11,788,846 B2
(45) Date of Patent: Oct. 17, 2023

(54) MAPPING AND DETERMINING SCENARIOS FOR GEOGRAPHIC REGIONS

(71) Applicant: Lyft, Inc., San Francisco, CA (US)

(72) Inventors: David Tse-Zhou Lu, Menlo Park, CA (US); Asif Haque, Menlo Park, CA (US)

(73) Assignee: Lyft, Inc., San Francisco, CA (US)

( * ) Notice: Subject to any disclaimer, the term of this patent is extended or adjusted under 35 U.S.C. 154(b) by 117 days.

(21) Appl. No.: 16/588,729

(22) Filed: Sep. 30, 2019

(65) Prior Publication Data

US 2021/0095970 A1  Apr. 1, 2021

(51) Int. Cl.
| | |
|---|---|
| *G01C 21/32* | (2006.01) |
| *G05D 1/02* | (2020.01) |
| *G06Q 50/30* | (2012.01) |

(52) U.S. Cl.
CPC .......... *G01C 21/32* (2013.01); *G05D 1/0231* (2013.01); *G05D 1/0257* (2013.01); *G05D 1/0291* (2013.01); *G06Q 50/30* (2013.01); *G05D 2201/0213* (2013.01)

(58) Field of Classification Search
CPC .... G01C 21/32; G05D 1/0291; G05D 1/0231; G05D 1/0257; G05D 2201/0213; G06Q 50/30
See application file for complete search history.

(56) References Cited

U.S. PATENT DOCUMENTS

| | | | |
|---|---|---|---|
| 7,680,749 B1 | 3/2010 | Golding et al. | |
| 8,489,316 B1 | 7/2013 | Hedges | |
| 9,672,734 B1 | 6/2017 | Ratnasingam | |
| 9,881,503 B1 | 1/2018 | Goldman | |
| 10,186,156 B2 | 1/2019 | Sweeney | |
| 10,338,594 B2 | 7/2019 | Long | |
| 10,372,132 B2 | 8/2019 | Herz | |
| 10,388,594 B2 | 8/2019 | Long | |
| 10,414,395 B1 | 9/2019 | Sapp et al. | |

(Continued)

FOREIGN PATENT DOCUMENTS

| | | |
|---|---|---|
| EP | 3342683 | 7/2018 |
| JP | 2010134499 A | 6/2010 |

OTHER PUBLICATIONS

International Patent Application No. PCT/US2020/039444, Search Report and Written Opinion dated Oct. 13, 2020, 10 pages.

(Continued)

*Primary Examiner* — Rami Khatib
(74) *Attorney, Agent, or Firm* — Sheppard Mullin Richter & Hampton LLP

(57) ABSTRACT

Systems, methods, and non-transitory computer-readable media can determine sensor data captured by at least one sensor of a vehicle while navigating a road segment. A plurality of features describing the road segment can be extracted from the sensor data. A map representation of the road segment can be determined based at least in part on the sensor data and the plurality of features extracted from the sensor data, the map representation being determined as the vehicle navigates the road segment. While the map representation of the road segment is being determined, at least one scenario associated with the road segment can be determined based at least in part on the map representation and the plurality of features extracted from the sensor data.

20 Claims, 10 Drawing Sheets

(56) References Cited

U.S. PATENT DOCUMENTS

| | | | |
|---|---|---|---|
| 10,992,755 B1* | 4/2021 | Tran | G06Q 50/30 |
| 11,126,180 B1 | 9/2021 | Kobilarov | |
| 11,150,660 B1 | 10/2021 | Kabirzadeh et al. | |
| 11,200,429 B1 | 12/2021 | Evans et al. | |
| 11,409,304 B1 | 8/2022 | Cai et al. | |
| 2003/0131069 A1 | 7/2003 | Lucovsky et al. | |
| 2003/0131142 A1 | 7/2003 | Horvitz et al. | |
| 2004/0210500 A1 | 10/2004 | Sobel et al. | |
| 2005/0044108 A1 | 2/2005 | Shah et al. | |
| 2005/0049993 A1 | 3/2005 | Nori et al. | |
| 2005/0137769 A1 | 6/2005 | Takamatsu et al. | |
| 2006/0036642 A1 | 2/2006 | Horvitz et al. | |
| 2008/0071465 A1 | 3/2008 | Chapman et al. | |
| 2008/0162498 A1 | 7/2008 | Omoigui | |
| 2009/0177685 A1 | 7/2009 | Ellis et al. | |
| 2009/0240728 A1 | 9/2009 | Shukla et al. | |
| 2010/0017060 A1 | 1/2010 | Zhang | |
| 2011/0251735 A1 | 10/2011 | Hayashi | |
| 2012/0078595 A1 | 3/2012 | Balandin et al. | |
| 2012/0078905 A1 | 3/2012 | Lin et al. | |
| 2012/0191716 A1 | 7/2012 | Omoigui | |
| 2012/0209505 A1 | 8/2012 | Breed et al. | |
| 2012/0259732 A1 | 10/2012 | Sasankan et al. | |
| 2012/0330540 A1 | 12/2012 | Ozaki et al. | |
| 2013/0166205 A1 | 6/2013 | Ikeda et al. | |
| 2013/0278442 A1 | 10/2013 | Rubin et al. | |
| 2014/0032581 A1 | 1/2014 | Young | |
| 2014/0257659 A1 | 9/2014 | Dariush | |
| 2015/0269198 A1 | 9/2015 | Cornish et al. | |
| 2015/0291146 A1 | 10/2015 | Prakah-Asante et al. | |
| 2016/0061625 A1 | 3/2016 | Wang | |
| 2016/0171521 A1 | 6/2016 | Ramirez | |
| 2016/0223343 A1 | 8/2016 | Averbuch | |
| 2016/0275730 A1 | 9/2016 | Bonhomme | |
| 2016/0334797 A1 | 11/2016 | Ross | |
| 2016/0357788 A1 | 12/2016 | Wilkes et al. | |
| 2017/0010107 A1 | 1/2017 | Shashua | |
| 2017/0017529 A1 | 1/2017 | Elvanoglu et al. | |
| 2017/0089710 A1 | 3/2017 | Slusar | |
| 2017/0113685 A1 | 4/2017 | Sendhoff | |
| 2017/0132334 A1 | 5/2017 | Levinson et al. | |
| 2017/0177937 A1 | 6/2017 | Harmsen | |
| 2017/0200063 A1 | 7/2017 | Nariyambut Murali et al. | |
| 2017/0241791 A1 | 8/2017 | Madigan | |
| 2017/0270372 A1 | 9/2017 | Stein | |
| 2017/0286782 A1 | 10/2017 | Pillai et al. | |
| 2017/0293763 A1 | 10/2017 | Shear et al. | |
| 2018/0005254 A1 | 1/2018 | Bai et al. | |
| 2018/0023964 A1* | 1/2018 | Ivanov | G06T 7/12 701/411 |
| 2018/0181095 A1 | 3/2018 | Funk | |
| 2018/0136979 A1 | 5/2018 | Morris | |
| 2018/0137373 A1 | 5/2018 | Rasusson | |
| 2018/0149491 A1 | 5/2018 | Tayama | |
| 2018/0217600 A1 | 8/2018 | Shashua et al. | |
| 2018/0246752 A1 | 8/2018 | Bonetta et al. | |
| 2018/0288060 A1 | 10/2018 | Jackson et al. | |
| 2018/0316695 A1 | 11/2018 | Esman | |
| 2019/0019329 A1 | 1/2019 | Eyler et al. | |
| 2019/0042867 A1 | 2/2019 | Chen et al. | |
| 2019/0049948 A1* | 2/2019 | Patel | G05D 1/0223 |
| 2019/0049968 A1 | 2/2019 | Dean | |
| 2019/0108753 A1 | 4/2019 | Kaiser et al. | |
| 2019/0143992 A1 | 5/2019 | Sohn et al. | |
| 2019/0171797 A1 | 6/2019 | Morris | |
| 2019/0174397 A1 | 6/2019 | Naqvi | |
| 2019/0205310 A1 | 7/2019 | Satkunarajah et al. | |
| 2019/0243371 A1 | 8/2019 | Nister | |
| 2019/0244040 A1 | 8/2019 | Hermann | |
| 2019/0256087 A1 | 8/2019 | Kim et al. | |
| 2019/0258251 A1 | 8/2019 | Ditty | |
| 2019/0258878 A1 | 8/2019 | Koivisto | |
| 2019/0266139 A1 | 8/2019 | Kumarasamy et al. | |
| 2019/0370615 A1 | 12/2019 | Murphy et al. | |
| 2019/0377354 A1 | 12/2019 | Shalev-Shwartz et al. | |
| 2020/0013088 A1 | 1/2020 | Naqvi | |
| 2020/0019161 A1 | 1/2020 | Stenneth | |
| 2020/0042626 A1 | 2/2020 | Curtis et al. | |
| 2020/0042651 A1 | 2/2020 | Curtis et al. | |
| 2020/0050190 A1* | 2/2020 | Patel | G05D 1/0276 |
| 2020/0050483 A1 | 2/2020 | Shear et al. | |
| 2020/0081445 A1 | 3/2020 | Stetson et al. | |
| 2020/0117200 A1 | 4/2020 | Akella et al. | |
| 2020/0151353 A1 | 5/2020 | Struttmann | |
| 2020/0180610 A1* | 6/2020 | Schneider | B60W 30/0956 |
| 2020/0183794 A1 | 6/2020 | Dwarampudi et al. | |
| 2020/0201890 A1* | 6/2020 | Viswanathan | G05D 1/0088 |
| 2020/0204534 A1 | 6/2020 | Beecham et al. | |
| 2020/0285788 A1 | 9/2020 | Brebner | |
| 2020/0351322 A1 | 11/2020 | Magzimof et al. | |
| 2020/0394455 A1 | 12/2020 | Lee et al. | |
| 2021/0011150 A1* | 1/2021 | Bialer | G01S 13/862 |
| 2021/0021539 A1 | 1/2021 | Shear et al. | |
| 2021/0041873 A1* | 2/2021 | Kim | G08G 1/20 |
| 2021/0053561 A1* | 2/2021 | Beller | B60W 30/18154 |
| 2021/0055732 A1* | 2/2021 | Caldwell | B62D 15/0265 |
| 2021/0097148 A1 | 4/2021 | Bagschik et al. | |
| 2021/0142526 A1 | 5/2021 | Mantyjarvi et al. | |
| 2021/0350147 A1 | 11/2021 | Yuan et al. | |
| 2022/0011130 A1* | 1/2022 | Hanniel | G05D 1/021 |
| 2022/0113371 A1* | 4/2022 | Han | G01S 19/426 |
| 2022/0163348 A1* | 5/2022 | Zhang | G01C 21/3844 |

OTHER PUBLICATIONS

International Patent Application No. PCT/US2019/045780, Search Report and Written Opinion dated Nov. 27, 2019, 10 pages.

* cited by examiner

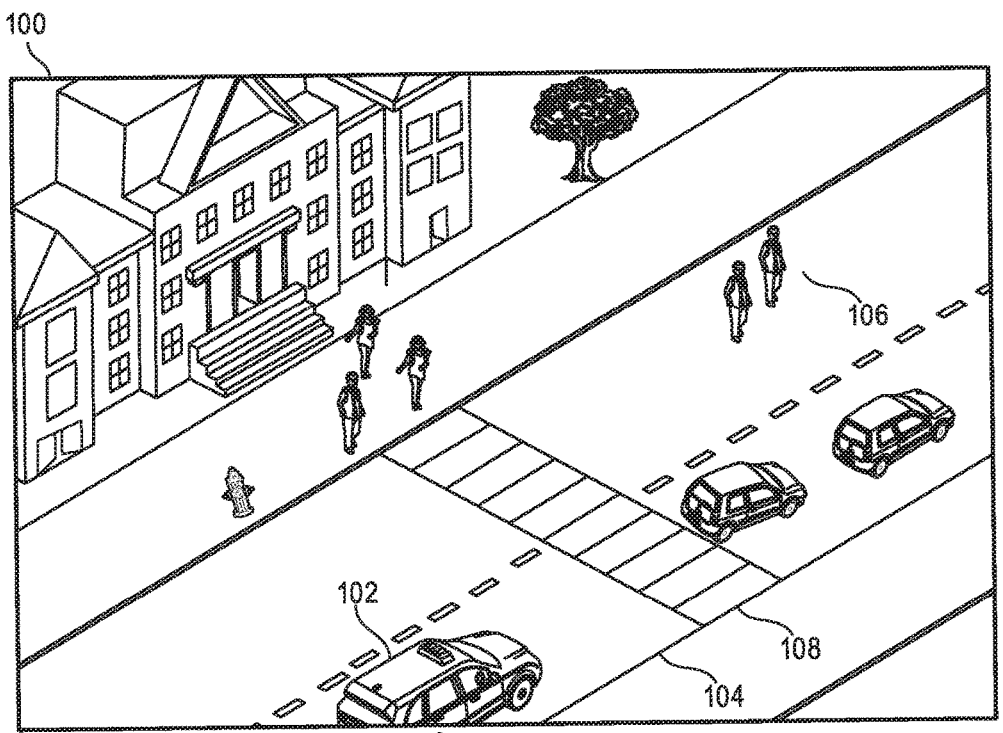
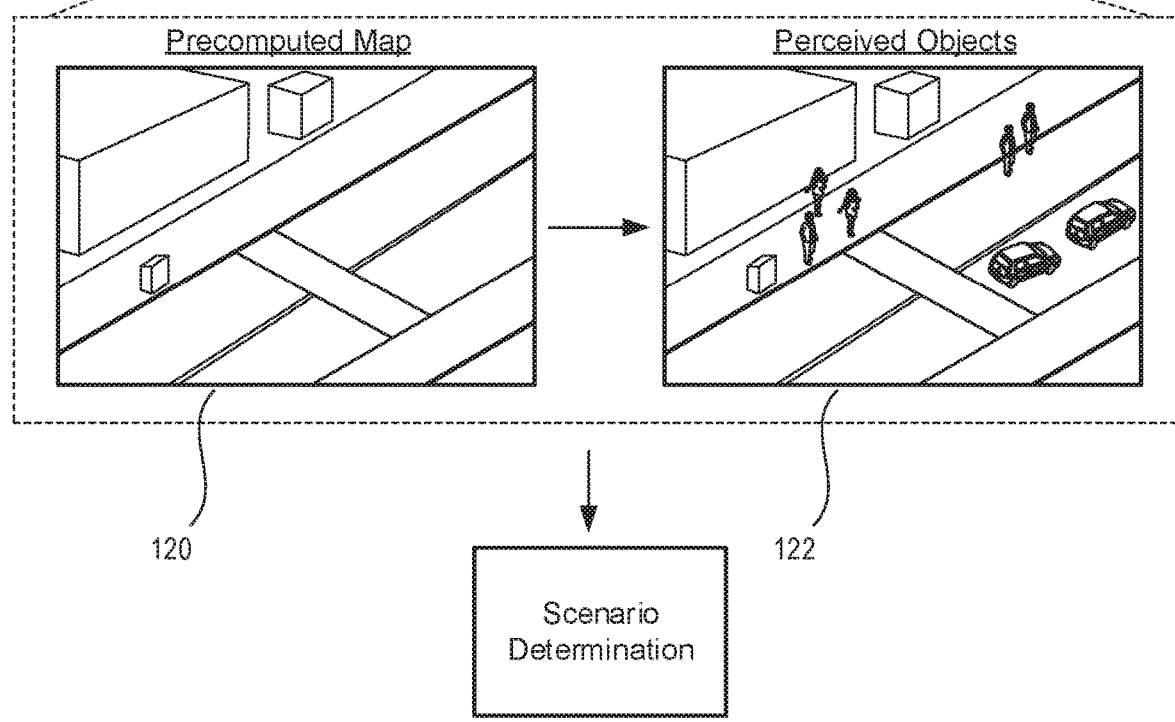
FIGURE 1A

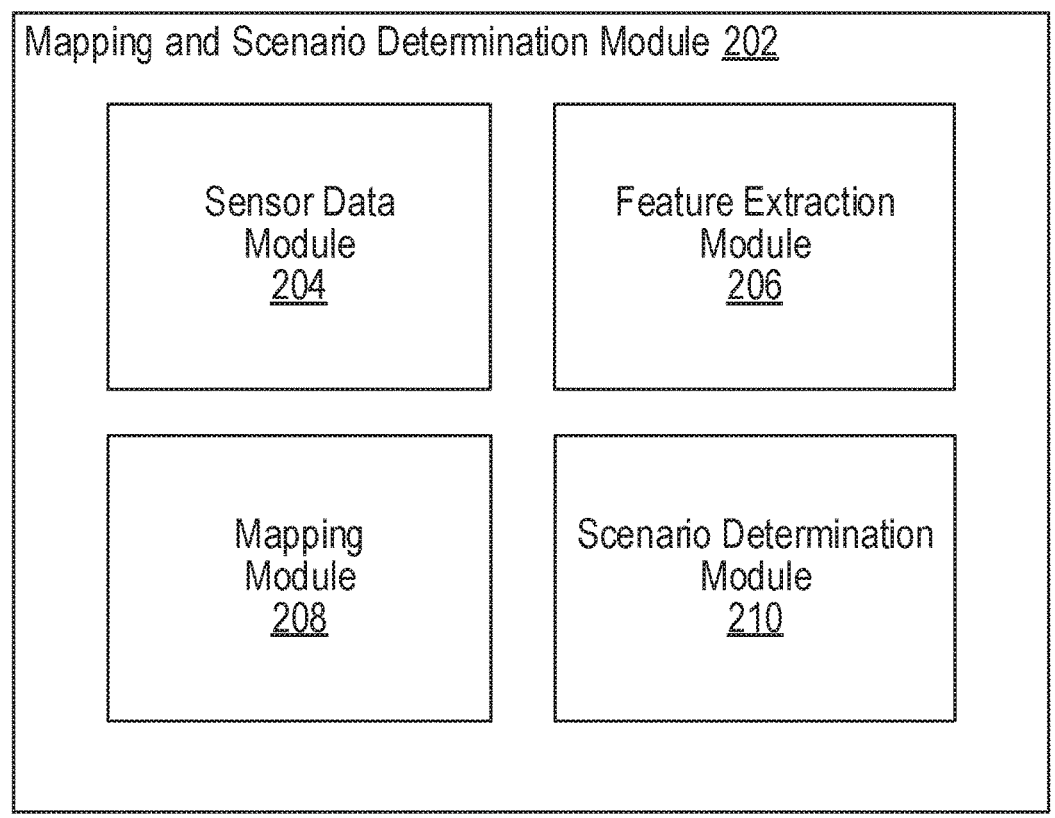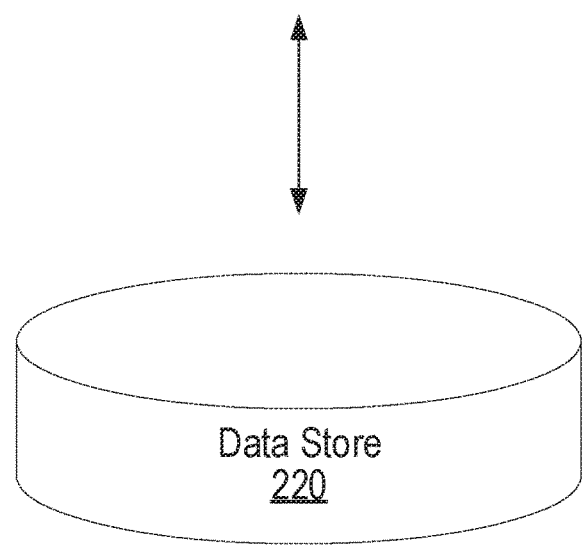
FIGURE 2

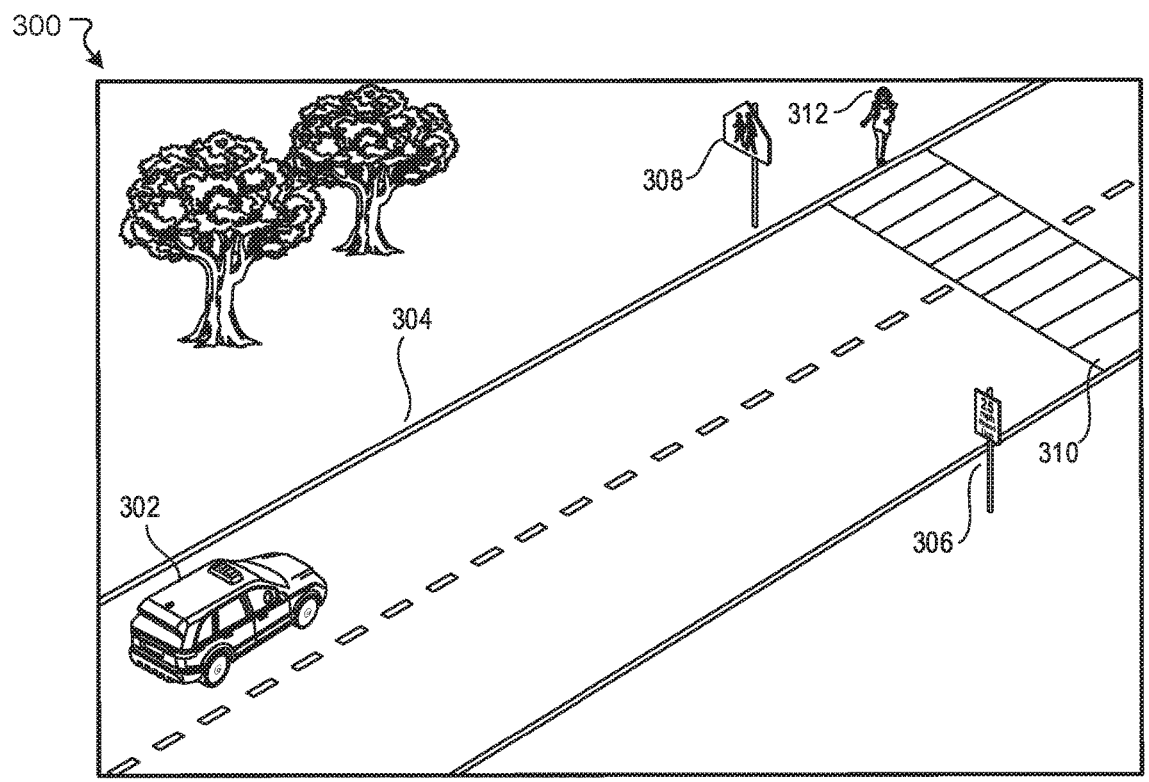
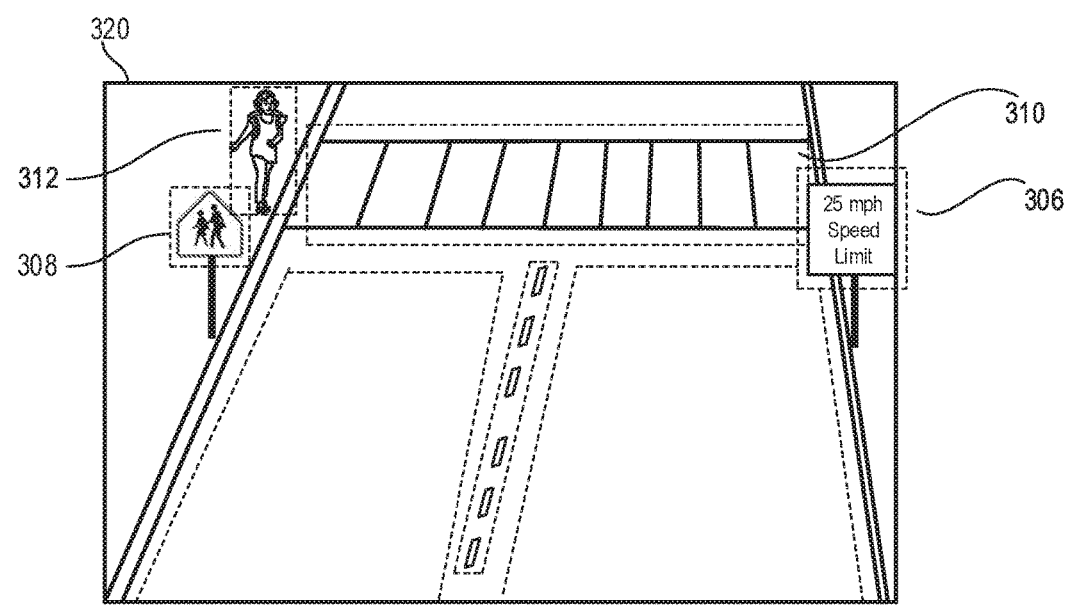
FIGURE 3A

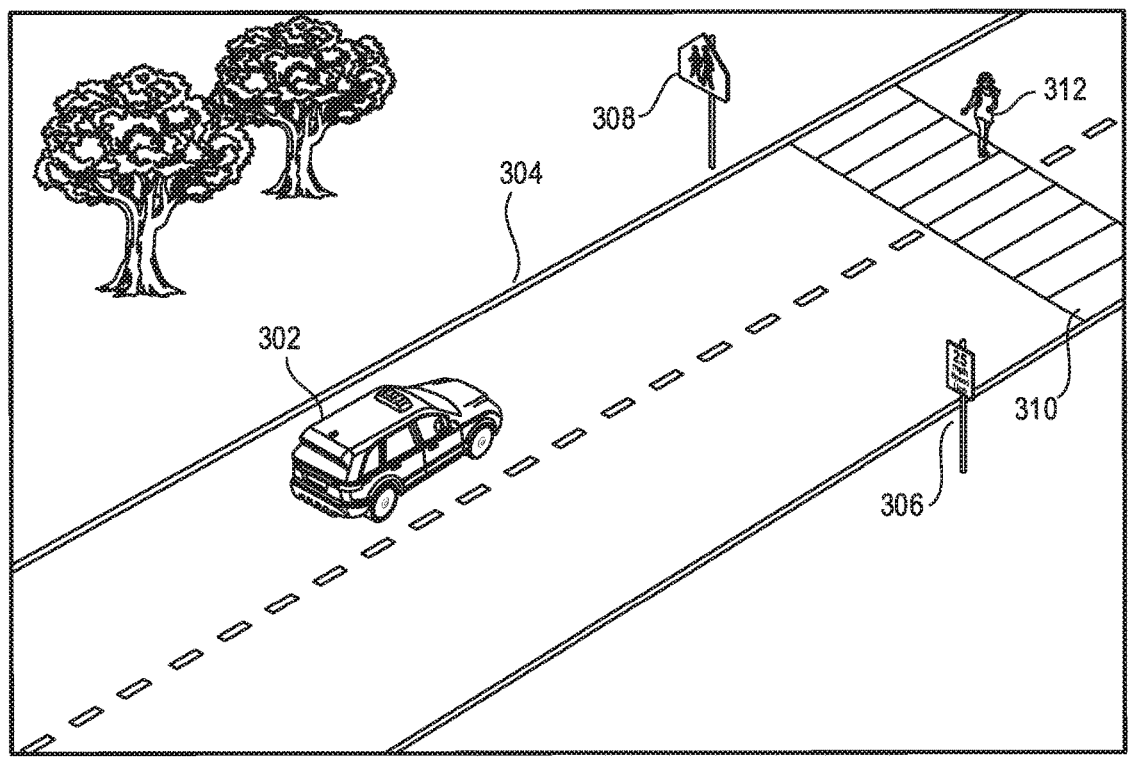
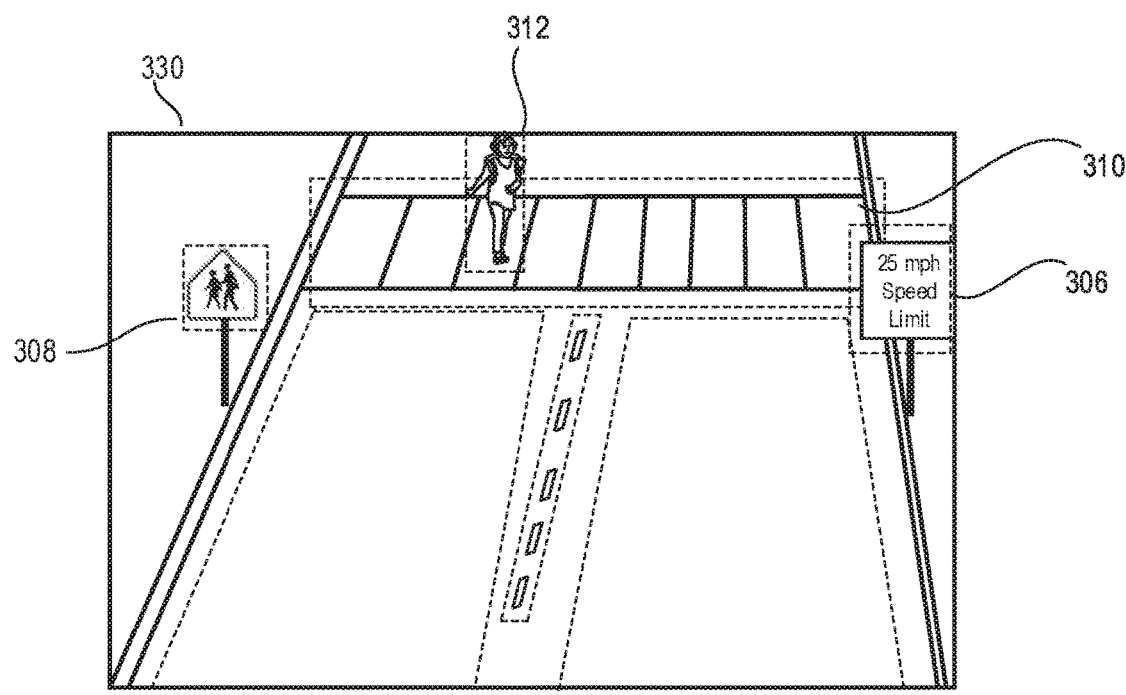
FIGURE 3B

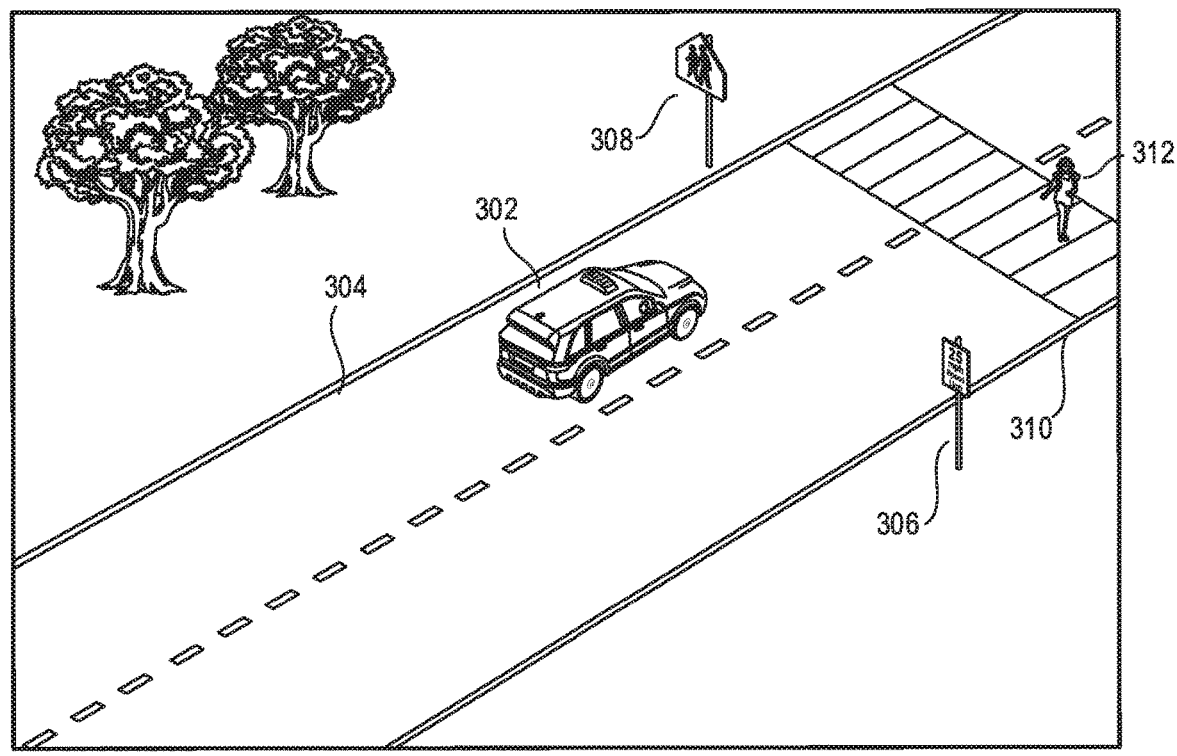
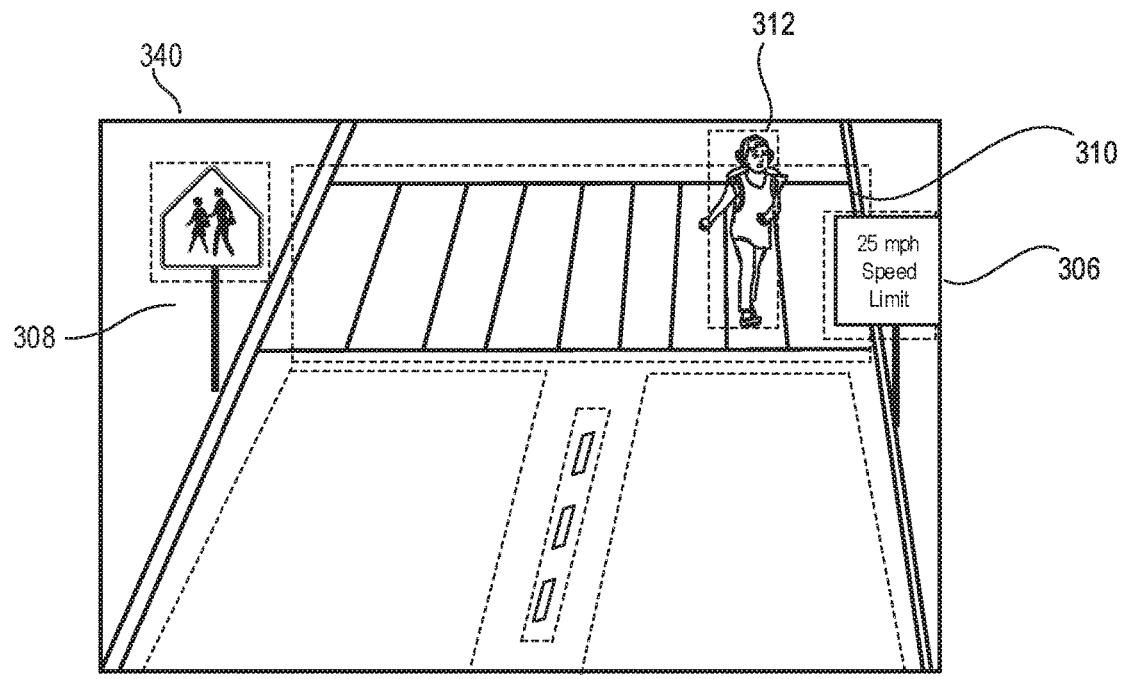
FIGURE 3C

500

```
┌─────────────────────────────────────────────┐
│ Determine sensor data captured by at least  │
│ one sensor of a vehicle while navigating    │
│ a road segment                              │
│ 502                                         │
└─────────────────────────────────────────────┘
                      │
                      ▼
┌─────────────────────────────────────────────┐
│ Extract a plurality of features describing  │
│ the road segment from the sensor data       │
│ 504                                         │
└─────────────────────────────────────────────┘
                      │
                      ▼
┌─────────────────────────────────────────────┐
│ Determine a map representation of the road  │
│ segment based at least in part on the       │
│ sensor data and the plurality of features   │
│ extracted from the sensor data, the map     │
│ representation being determined as the      │
│ vehicle navigates the road segment          │
│ 506                                         │
└─────────────────────────────────────────────┘
                      │
                      ▼
┌─────────────────────────────────────────────┐
│ While the map representation of the road    │
│ segment is being determined, determine at   │
│ least one scenario associated with the road │
│ segment based at least in part on the map   │
│ representation and the plurality of         │
│ features extracted from the sensor data     │
│ 508                                         │
└─────────────────────────────────────────────┘
```

FIGURE 5

MAPPING AND DETERMINING SCENARIOS FOR GEOGRAPHIC REGIONS

FIELD OF THE INVENTION

The present technology relates to the field of vehicles. More particularly, the present technology relates to systems, apparatus, and methods for mapping and scenario determination.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine sensor data captured by at least one sensor of a vehicle while navigating a road segment. A plurality of features describing the road segment can be extracted from the sensor data. A map representation of the road segment can be determined based at least in part on the sensor data and the plurality of features extracted from the sensor data, the map representation being determined as the vehicle navigates the road segment. While the map representation of the road segment is being determined, at least one scenario associated with the road segment can be determined based at least in part on the map representation and the plurality of features extracted from the sensor data.

In an embodiment, extracting the plurality of features comprises determining map features describing the road segment from the sensor data; determining static objects detected on or along the road segment from the sensor data; and determining dynamic objects detected on or along the road segment from the sensor data.

In an embodiment, the map features include at least one of: a road segment length, a road segment quality, a roadway type, information describing traffic lanes in the road segment, information describing a presence of one or more bike lanes, information describing a presence of one or more crosswalks, and a zone in which the road segment is geographically located.

In an embodiment, the at least one scenario is determined in real-time or near real-time based on at least one detected interaction between the map features, static objects, and dynamic objects.

In an embodiment, the systems, methods, non-transitory computer readable media are further configured to provide information describing the map representation and the at least one scenario to a transportation management system, wherein the transportation management system applies the information when routing a fleet of vehicles that offer transportation services.

In an embodiment, information describing the at least one scenario includes an identification code referencing the at least one scenario, and wherein the transportation management system interprets the identification code to recognize the at least one scenario.

In an embodiment, the at least one sensor corresponds to an optical camera and the sensor data includes a set of images captured by the optical camera over a period of time during which the vehicle navigated the road segment.

In an embodiment, the at least one sensor corresponds to an optical camera associated with a mobile device and the sensor data includes a set of images captured by the optical camera associated with the mobile device over a period of time during which the vehicle navigated the road segment.

In an embodiment, the at least one sensor corresponds to a Light Detection And Ranging (LiDAR) system and the sensor data includes a set of point clouds captured by the LiDAR system over a period of time during which the vehicle navigated the road segment.

In an embodiment, the at least one sensor corresponds to a radar system and the sensor data includes a set of radar data captured by the radar system over a period of time during which the vehicle navigated the road segment.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIGS. 1A-1B illustrate various scenarios that may be experienced and determined by a vehicle, according to an embodiment of the present technology.

FIG. 2 illustrates an example mapping and scenario determination module, according to an embodiment of the present technology.

FIGS. 3A-3C illustrate example diagrams of a vehicle simultaneously mapping a road segment and determining scenarios, according to an embodiment of the present technology.

FIG. 5 illustrates an example method, according to an embodiment of the present technology.

Figure 1B:
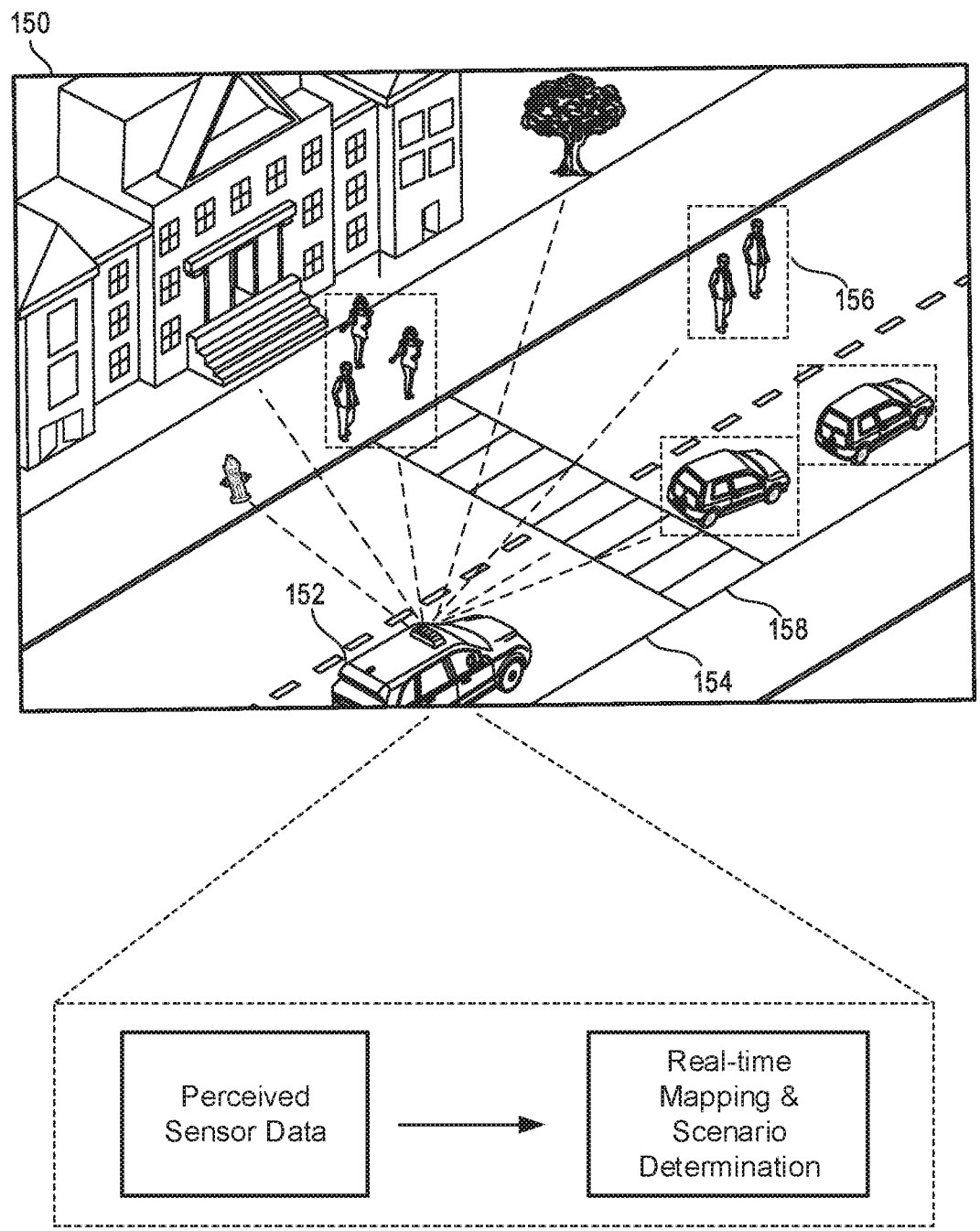

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. For example, a vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, an autonomous vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards. In some instances, such vehicles may be used by a transportation management system to provide ride services or other types of services. A transportation management system may comprise a fleet of such vehicles. Each vehicle in the fleet may include one or more sensors in a sensor suite. In general, a vehicle can traverse a geographic location or region using a number of different routes. Each route can be made up of one or more road segments. Further, each road segment can be associated with a number of scenarios that may be encountered by vehicles while driving on those road segments. For instance, a road segment in a mountainous terrain may be associated with a "fallen debris" scenario. In another example, a road segment near a school may be associated with a "schoolchildren" scenario. Such scenarios can be taken into consideration when routing vehicles to reduce risk and improve safety, for example, by either avoiding road segments that pose a high level of risk of encountering certain types of objects (e.g., animals, debris, etc.) or by modifying operation of the vehicles when navigating high risk road segments (e.g., reducing speed, increasing distance between objects, etc.). Under conventional approaches, geographic regions must generally be mapped before scenarios associated with those regions can be identified. For instance, existing mapping approaches typically involve vehicles driving through a geographic region to collect data for generating a detailed map and using that detailed map to interpret sensor data from which scenarios can be extracted and characterized. These existing approaches require a significant time investment in data collection and the use of expensive sensor suites to generate highly accurate maps. Only after generating such detailed maps can scenarios be identified and associated with the region. For example, FIG. 1A illustrates an example environment 100 in which a vehicle 102 is shown navigating a road 104. In general, the vehicle 102 may be equipped with one or more sensors that can be used to capture environmental information, such as information describing a given road and objects present on or along the road. For example, in some instances, the vehicle 102 may be equipped with one or more sensors in a sensor suite including optical cameras, LiDAR, radar, infrared cameras, and ultrasound equipment, to name some examples. Such sensors can be used to collect information that can be used by the vehicle 102 to understand its environment and objects within the environment. While navigating, the vehicle 102 needs to be aware of its precise location within the environment 100 and corresponding locations of both static and dynamic objects present in the environment 100. Under conventional approaches, the vehicle 102 would rely on a precomputed map 120 when navigating the environment 100. The precomputed map 120 can identify map features and static objects that are present within the environment 100. Based on this precomputed map 120, the vehicle 102 thereafter can perceive and differentiate between static objects (e.g., building, trees, fire hydrant, crosswalk) and dynamic objects (e.g., pedestrians, vehicles, etc.) that were detected by the vehicle 102 within the environment 100, as shown in a visual representation of perceived objects 122. The interactions between such static and dynamic objects thereafter can be processed to determine and log scenarios encountered by the vehicle 102. For instance, a "jay-walking" scenario may be determined based on a group of pedestrians 106 crossing the road 104 outside of a crosswalk 108. As mentioned, under conventional approaches, such scenario determination is typically performed after the precomputed map 120 has been generated from an offline (non real-time) process and provided to the vehicle 102 for use when navigating the environment 100.

An improved approach in accordance with the present technology overcomes the foregoing and other disadvantages associated with conventional approaches. The improved approach can allow map features of a road segment 152 and scenarios corresponding to the road segment 152 to be collected and characterized simultaneously while a single vehicle 152 travels the road segment 154 within an environment 150, as illustrated in the example of FIG. 1B. For example, the vehicle 152 can include a sensor suite that can be used to determine map features for the environment 150. For example, the vehicle 152 can periodically capture sensor data, such as images of the environment 150 using an optical camera of a mobile device. In this example, map features for the environment 150 can be determined based on static objects (e.g., traffic signs, traffic lights, buildings, etc.) and road features (e.g., lane indicators, crosswalks, number of lanes, etc.) that are detected in the captured images. Further, the vehicle 152 can also determine dynamic objects (e.g., cars, pedestrians, bikers, animals, etc.) that are present within the environment 150 from the captured images. In various embodiments, the vehicle 152 can determine scenarios based on observed interactions between identified static objects, map features, and detected dynamic objects. For example, in some embodiments, the vehicle 152 may determine that a group of pedestrians 156 is crossing the road segment 154 outside of a crosswalk 158 based on an analysis of image data. In this example, a "jay-walking" scenario can be identified based on map features detected from the image data (e.g., lanes, street signs, etc.), the group of pedestrians 156 crossing the road segment 154 outside of the crosswalk 158, and a lack of static objects (e.g., crosswalk signs or lights) around the region where the group of pedestrians 156 is crossing the road segment 154. These determinations may be made and the "jay-walking" scenario may be identified simultaneously with the mapping of the environment 150. Thus, embodiments described herein can characterize objects and map features represented in sensor data and can simultaneously determine one or more potential scenarios that may be occurring at a particular location and time based on the interactions between static objects, dynamic objects, and identified map features over time. In various embodiments, these determinations may be made in real-time using sensor capabilities such that a fleet of vehicles may characterize and report scenarios as they are encountered using much cheaper and more scalable sensor information. As a result, no pre-existing detailed map of a geographic region is necessary to understand map features and objects represented in image data of the geographic region. The map features and scenario determinations may be reported and stored by both the vehicle 152 and an associated transportation management system for use by a fleet of vehicles that offer transportation services. Other types of sensor data may also be used. For example, embodiments described herein may be implemented to map and determine scenarios in real-time (or near real-time) based on point cloud data from LiDAR systems, cameras, or radar data. More details relating to the present technology are provided below.

FIG. 2 illustrates an example system 200 including an example mapping and scenario determination module 202, according to an embodiment of the present technology. As shown in the example of FIG. 2, the mapping and scenario determination module 202 can include a sensor data module 204, a feature extraction module 206, a mapping module 208, and a scenario determination module 210. In some instances, the example system 200 can include at least one data store 220. The mapping and scenario determination module 202 can be configured to communicate and operate with the at least one data store 220. The at least one data store 220 can be configured to store and maintain various types of data. In some embodiments, some or all of the functionality performed by the mapping and scenario determination module 202 and its sub-modules may be performed by one or more backend computing systems, such as a transportation management system 660 of FIG. 6. In some embodiments, some or all of the functionality performed by the mapping and scenario determination module 202 and its sub-modules may be performed by one or more computing systems implemented in a vehicle, such as a vehicle 640 of FIG. 6. In some embodiments, some or all data stored in the data store 220 can be stored by the transportation management system 660 of FIG. 6. In some embodiments, some or all data stored in the data store 220 can be stored by the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details.

The sensor data module 204 can be configured to access sensor data captured by vehicles. For example, the sensor data may include data captured by one or more sensors including optical cameras, LiDAR, radar, infrared cameras, and ultrasound equipment, to name some examples. The sensor data module 204 can obtain such sensor data, for example, from the data store 220 or directly from sensors associated with a vehicle in real-time (or near real-time). In some instances, the obtained sensor data may have been collected by a fleet of vehicles that offer transportation services. In some embodiments, the sensor data module 204 can determine contextual information for sensor data such as a respective calendar date, day of week, and time of day during which the sensor data was captured. Such contextual information may be obtained from an internal clock of a sensor or a computing device, one or more external computing systems (e.g., Network Time Protocol (NTP) servers), or GPS data, to name some examples. More details describing the types of sensor data that may be obtained by the sensor data module 204 are provided below in connection with an array of sensors 644 of FIG. 6.

The feature extraction module 206 can be configured to extract features from sensor data captured by a vehicle. For example, the sensor data may be a series of images that were captured by the vehicle at some frequency (e.g., 5 Hz, 10 Hz, etc.) while driving on a road segment. In various embodiments, the extracted features can include, for example, map features corresponding to the road segment, static and dynamic objects detected on or along the road segment, and contextual features describing the road segment. For example, the feature extraction module 206 can analyze image data captured by the vehicle to determine map features corresponding to the road segment. These map features can be used to determine (or predict) scenarios for the road segment while also mapping the road segment in real-time (or near real-time). Such map features may be determined from the image data captured by the vehicle. For example, in some embodiments, the feature extraction module 206 can determine map features such as road segment length (e.g., a start point and an end point that defines a road segment), road segment quality (e.g., presence of potholes, whether the road segment is paved or unpaved, etc.), roadway type (e.g., freeway, highway, expressway, local street, rural road, etc.), information describing traffic lanes in the road segment (e.g., speed limits, number of available lanes, number of closed lanes, locations of any intersections, merging lanes, traffic signals, street signs, curbs, etc.), the presence of any bike lanes, and the presence of any crosswalks, to name some examples. In some embodiments, the feature extraction module 206 can also determine whether the road segment is within a specific zone (e.g., residential zone, school zone, business zone, mixed-use zone, high density zone, rural zone, etc.), for example, based on detected street signs and location data. The feature extraction module 206 can also analyze the image data to identify objects detected on or along the road segment. When identifying features, such as static and dynamic objects, the feature extraction module 206 can apply generally known object detection and recognition techniques, including machine and deep learning techniques. The identified objects can include, for example, pedestrians, vehicles, curbs, trees, animals, and debris, to name some examples. In some embodiments, the feature extraction module 206 can determine respective attributes for each of the identified objects. For example, upon detecting a pedestrian, the feature extraction module 206 can determine attributes related to the pedestrian. In this example, the attributes can include a distance between the pedestrian and the vehicle, a velocity at which the pedestrian is traveling, and a direction in which the pedestrian is traveling, to name some examples. In some embodiments, the attributes can also describe the vehicle that is sensing (or detecting) the pedestrian including, for example, a velocity at which the vehicle is traveling, a direction in which the vehicle is traveling, and a lane within which the vehicle is traveling. The feature extraction module 206 can also analyze the image data to determine contextual features that correspond to the road segment. These contextual features can be used to determine (or predict) scenarios for the road segment while also mapping the road segment in real-time (or near real-time). For example, in some embodiments, the feature extraction module 206 can determine a respective calendar date, day of week, and time of day during which the image data was captured. In some embodiments, the feature extraction module 206 can determine weather conditions (e.g., clear skies, overcast, fog, rain, sleet, snow, etc.) encountered while navigating the road segment based on the image data. In some embodiments, such contextual features may be determined from external data sources (e.g., weather data, etc.). Many variations are possible. For example, although the examples herein reference image data, the approaches described can be adapted for use with any type of sensor data including, for example, point clouds generated by LiDAR systems and radar data generated by radar systems.

The mapping module 208 can be configured to generate maps based on captured sensor data and features extracted from the sensor data. For example, in some embodiments, a vehicle may capture a series of images at some frequency while driving on a road segment. The images can be analyzed to extract features (e.g., map features, static objects, dynamic objects, contextual features, etc.). In such embodiments, the captured images and extracted features can be used to generate and label a map of the road segment using generally known techniques, such as image stitching. The labeled map can identify map features describing the road segment including objects that were determined to be present on or along the road segment. Many variations are possible. For example, in some embodiments, the mapping module 208 can generate and label a map based on point cloud data determined by LiDAR systems. In such embodiments, the point cloud data and features extracted from the point cloud data can be used to generate and label a map of the road segment using generally known techniques, such as by projecting and flattening the point cloud data. The labeled map can identify map features describing the road segment including objects that were determined to be present on or along the road segment.

The scenario determination module 210 can be configured to determine (or predict) scenarios for road segments based on captured sensor data and features extracted from the sensor data. For example, the scenario determination module 210 can determine (or predict) scenarios for a road segment based on interactions between map features associated with the road segment, static and dynamic objects associated with the road segment, and contextual features describing the road segment. In some embodiments, the scenario determination module 210 determines scenarios based on pre-defined rules. In such embodiments, the scenario determination module 210 can determine whether features associated with the road segment match pre-defined features associated with a given scenario. For example, the scenario determination module 210 can determine whether an interaction between map features, static objects, and dynamic objects detected along a road segment correspond to a given scenario. In some embodiments, the road segment can be associated with a scenario when all of the features associated with the road segment match features associated with the scenario. For example, assume a first scenario for "School Bus Stopping" is associated with features of a school bus with active hazard lights along with the presence of a stop sign. Assume further that sensor data for the road segment indicates the presence of features corresponding to a school bus with its hazard lights in use and the presence of a stop sign. In this example, the scenario determination module 210 may determine that the presence of the school bus with active hazard lights and the presence of the stop sign match the features associated with the first scenario. In some instances, a scenario can be associated with the road segment even if all features associated with the road segment do not exactly match all features associated with the scenario. For example, in some embodiments, the road segment can be associated with a scenario when a threshold level of similarity is determined between features associated with the road segment and features associated with the scenario. For example, when a threshold number of features associated with the road segment and features associated with a scenario match, the road segment can be associated with the scenario. Many variations are possible. Other approaches for determining (or predicting) scenarios for road segments are contemplated by the present technology. For example, in some embodiments, one or more machine or deep learning models can be trained to predict scenarios for a road segment based on features determined for the road segment (e.g., map features, static and dynamic objects, contextual features, etc.). As another example, in various embodiments, features determined for a road segment can be represented as a vector. Similarly, features associated with a scenario can also be represented as a vector. In such embodiments, the road segment can be associated with the scenario based on satisfaction of a threshold level of similarity (e.g., cosine similarity) between their vector representations. Again, many variations are possible.

FIG. 3A illustrates an example diagram 300 of a vehicle 302 simultaneously mapping a road segment 304 and determining scenarios associated with the road segment 304. For example, the vehicle 302 can perform the mapping and scenario determination in real-time (or near real-time) as the vehicle 302 navigates the road segment 304. Further, the vehicle 302 can collect sensor data (e.g., image data) as the vehicle 302 navigates the road segment 304. For example, the image data can be collected at some predefined frequency. Moreover, the image data can be collected using one or more sensors, such as optical cameras, associated with the vehicle 302. In some embodiments, the image data can be collected using one or more optical cameras in a lightweight mobile device mounted in the vehicle 302. As shown in the example diagram 300, the road segment 304 includes street signs (e.g., a speed limit sign 306, a school crossing sign 308) and a crosswalk 310. The example diagram 300 also shows a pedestrian 312 crossing the road segment 304 using the crosswalk 310. FIG. 3A also illustrates an image 320 captured by the vehicle 302 while navigating the road segment 304. In various embodiments, images captured by the vehicle 302 can be analyzed to determine features associated with the road segment 304. For example, such features can include map features that describe the road segment 304, static and dynamic objects detected on or along the road segment 304, and contextual features, as described above. For example, the image 320 can be analyzed to determine map features, such as a number of lanes in the road segment 304, the speed limit sign 306, the school crossing sign 308, and the crosswalk 310. Further, the image 320 can be analyzed to determine the presence of static and dynamic objects. For instance, the pedestrian 312 may be determined to be an object based on an analysis of the image 320. However, the object may not yet be categorized as a static or dynamic object since only a single image 320 has been analyzed. In various embodiments, feature determinations can be refined as additional images are captured by the vehicle 302. For example, FIGS. 3B and 3C illustrate additional diagrams of the vehicle 302 as it proceeds along the road segment 304 including corresponding images 330, 340 captured by the vehicle 302 at different points in time. The images 330, 340 captured by the vehicle 302 can further be analyzed to improve feature detection and classification. In this example, the images 330, 340 can be analyzed to classify the pedestrian 312 as a dynamic object after determining the pedestrian 312 is moving along the crosswalk 310 over time. Once determined, the features associated with the road segment 304 can be used to simultaneously generate a map of the road segment 304 and determine scenarios associated with the road segment 304 in real-time (or near real-time) as the vehicle travels along the road segment 304, as described above. As just one example, based on the generated map and the detected features associated with the road segment 304, a scenario of "pedestrian crossing in crosswalk" can be determined for the road segment 304 as the vehicle 302 is traveling along the road segment 304.

Figure 4:
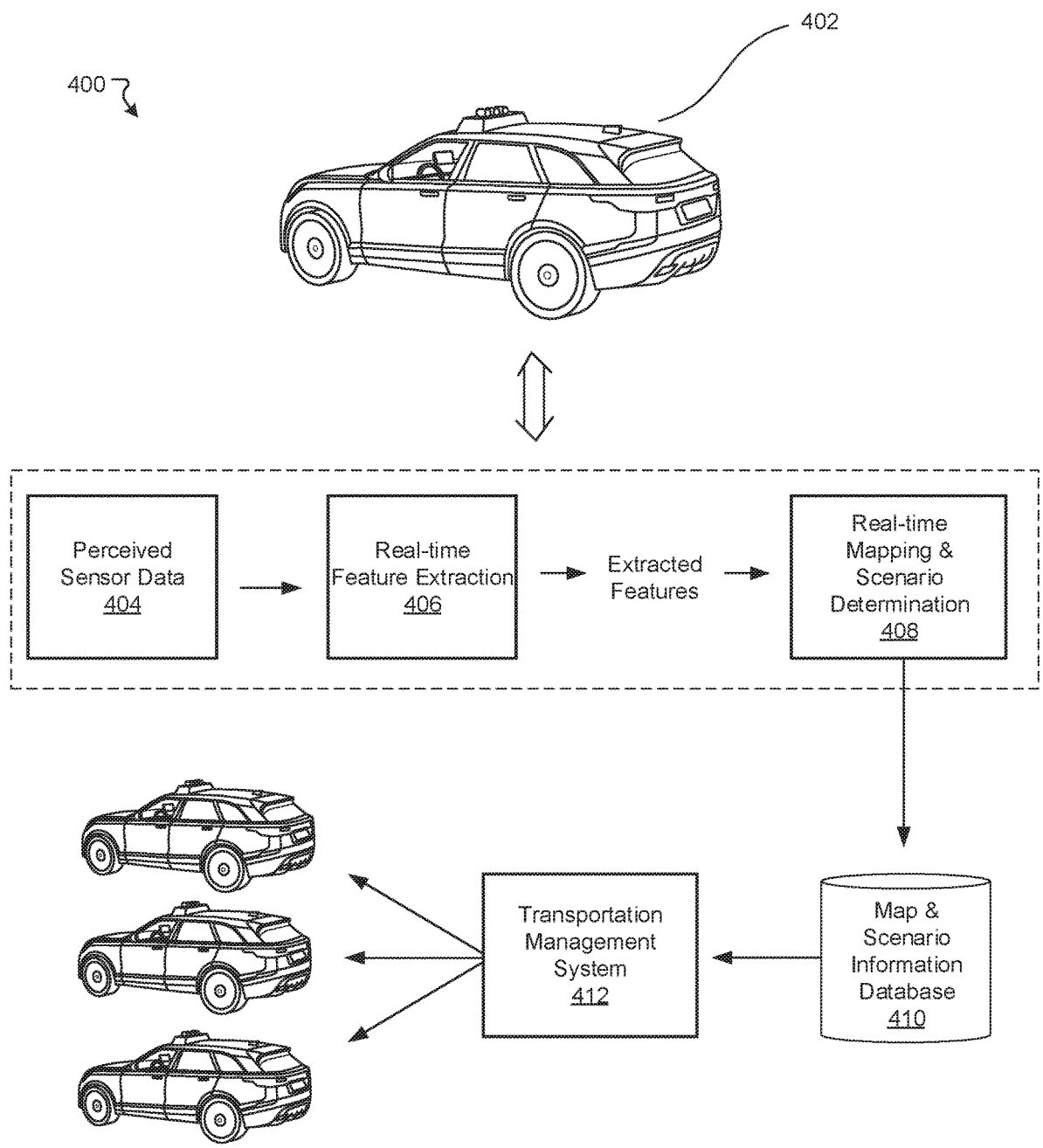
FIG. 4 illustrates an example diagram of an approach for simultaneously mapping and determining scenarios, according to an embodiment of the present technology.
Figure 6:
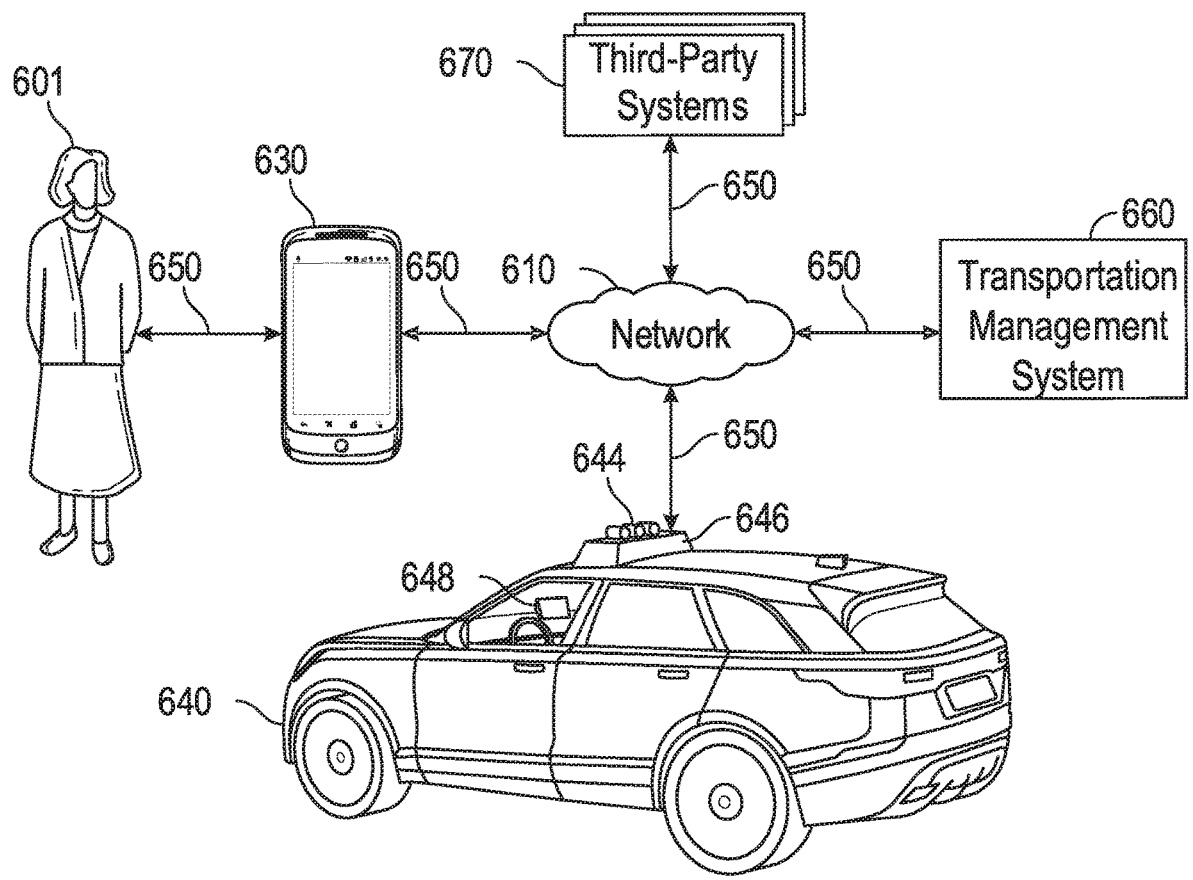
FIG. 6 illustrates an example block diagram of a transportation management environment, according to an embodiment of the present technology.

FIG. 4 illustrates an example diagram 400 of an approach for real-time mapping and scenario determination based on functionality of the mapping and scenario determination module 202, according to an embodiment of the present technology. In this example, the approach can be implemented by a vehicle 402. The vehicle 402 can be, for example, the vehicle 640 as shown in FIG. 6. For example, at block 404, sensor data captured by sensors in the vehicle 402 while navigating a road segment can be obtained. For example, the sensor data may be, for example, image data captured by optical cameras in a sensor suite or mobile device associated with the vehicle 402. At block 406, the sensor data can be processed in real-time (or near real-time) to extract features describing the road segment. The extracted features can include map features describing the road segment, static and dynamic objects detected on or along the road segment, and contextual features, for example. At block 408, the extracted features can be applied to generate a map of the road segment and determine scenarios associated with the road segment in real-time (or near real-time) as the vehicle travels along the road segment, as described above. In various embodiments, information describing the map of the road segment and scenarios determined for the road segment can be provided to a transportation management system 412 (e.g., the transportation management system 660 of FIG. 6). For example, the information can be stored in a map and scenario information database 410. In various embodiments, the stored information can be used by the transportation management system 412 to route a fleet of vehicles that offer transportation services. In some embodiments, the vehicle 402 and the transportation management system 412 can maintain an association between predefined scenarios and their corresponding identification codes. In such embodiments, the vehicle 102 can inform the transportation management system 412 of scenarios determined for a road segment by communicating their corresponding identification codes along with relevant contextual information. Many variations are possible.

FIG. 5 illustrates an example method 500, according to an embodiment of the present technology. At block 502, sensor data captured by at least one sensor of a vehicle can be determined while navigating a road segment. At block 504, a plurality of features describing the road segment can be extracted from the sensor data. At block 506, a map representation of the road segment can be determined based at least in part on the sensor data and the plurality of features extracted from the sensor data, the map representation being determined as the vehicle navigates the road segment. At block 508, while the map representation of the road segment is being determined, at least one scenario associated with the road segment can be determined based at least in part on the map representation and the plurality of features extracted from the sensor data.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the mapping and scenario determination module 202 may be implemented by one or more computing systems of the transportation management system 660. In some embodiments, some or all modules of the mapping and scenario determination module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
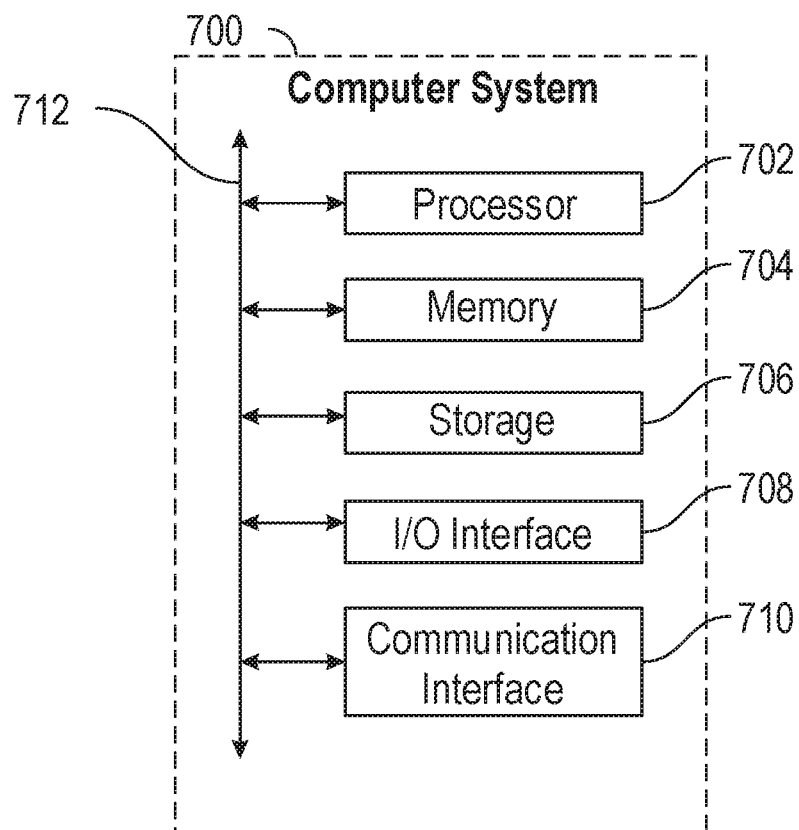
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   determining, by a computing system, sensor data captured by at least one sensor of a vehicle while navigating a road segment that is unmapped;
   extracting, by the computing system, a plurality of features describing the road segment that is unmapped from the sensor data;
   generating, by the computing system, a map of the road segment based at least in part on (i) the sensor data captured by the at least one sensor of the vehicle and (ii) the plurality of features describing the road segment extracted from the sensor data, wherein the generated map includes at least one label that identifies at least one of the plurality of features extracted from the sensor data captured by the at least one sensor of the vehicle while navigating the road segment;

determining, by the computing system, predetermined scenarios for the road segment based at least in part on the plurality of features describing the road segment;

subsequent to generating the map of the road segment, determining, by the computing system, a control of the vehicle using at least one scenario of the predetermined scenarios determined based at least in part on (i) the map being generated of the road segment and (ii) a determination that the plurality of features describing the road segment extracted from the sensor data that indicate a presence of a dynamic object, a static object, and an interaction between the dynamic object and the static object at the road segment satisfy a threshold number of features associated with the at least one scenario of the predetermined scenarios, wherein the control of the vehicle relative to the road segment is based at least in part on the plurality of features satisfying the threshold number of features; and providing, by the computing system, the map of the road segment and the predetermined scenarios determined for the road segment for application to a fleet of vehicles.

2. The computer-implemented method of claim 1, wherein extracting the plurality of features describing the road segment from the sensor data further comprises:

determining, by the computing system, map features describing the road segment from the sensor data;

determining, by the computing system, static objects detected on or along the road segment from the sensor data; and determining, by the computing system, dynamic objects detected on or along the road segment from the sensor data.

3. The computer-implemented method of claim 2, wherein the map features include at least one of: a road segment length, a road segment quality, a roadway type, information describing traffic lanes in the road segment, information describing a presence of one or more bike lanes, information describing a presence of one or more crosswalks, and a zone in which the road segment is geographically located.

4. The computer-implemented method of claim 1, wherein the predetermined scenarios for the road segment are determined by a machine learning model.

5. The computer-implemented method of claim 1, the method further comprising:

providing, by the computing system, information describing the map and the at least one scenario to a transportation management system, wherein the transportation management system applies the information when routing the fleet of vehicles that offer transportation services.

6. The computer-implemented method of claim 5, wherein information describing the at least one scenario includes an identification code referencing the at least one scenario, and wherein the transportation management system interprets the identification code to recognize the at least one scenario.

7. The computer-implemented method of claim 1, wherein the at least one sensor corresponds to an optical camera and the sensor data includes a set of images captured by the optical camera over a period of time during which the vehicle navigated the road segment.

8. The computer-implemented method of claim 1, wherein the at least one sensor corresponds to an optical camera associated with a mobile device and the sensor data includes a set of images captured by the optical camera associated with the mobile device over a period of time during which the vehicle navigated the road segment.

9. The computer-implemented method of claim 1, wherein the at least one sensor corresponds to a Light Detection And Ranging (LiDAR) system and the sensor data includes a set of point clouds captured by the LiDAR system over a period of time during which the vehicle navigated the road segment.

10. The computer-implemented method of claim 1, wherein the at least one sensor corresponds to a radar system and the sensor data includes a set of radar data captured by the radar system over a period of time during which the vehicle navigated the road segment.

11. A system comprising:

at least one processor; and a memory storing instructions that, when executed by the at least one processor, cause the system to perform:

determining sensor data captured by at least one sensor of a vehicle while navigating a road segment that is unmapped;

extracting a plurality of features describing the road segment that is unmapped from the sensor data;

generating a map of the road segment based at least in part on (i) the sensor data captured by the at least one sensor of the vehicle and (ii) the plurality of features describing the road segment extracted from the sensor data, wherein the generated map includes at least one label that identifies at least one of the plurality of features extracted from the sensor data captured by the at least one sensor of the vehicle while navigating the road segment;

determining predetermined scenarios for the road segment based at least in part on the plurality of features describing the road segment;

subsequent to generating the map of the road segment, determining a control of the vehicle using at least one scenario of the predetermined scenarios determined based at least in part on (i) the map being generated of the road segment and (ii) a determination that the plurality of features describing the road segment extracted from the sensor data that a indicate presence of a dynamic object, a static object, and an interaction between the dynamic object and the static object at the road segment satisfy a threshold number of features associated with the at least one scenario of the predetermined scenarios, wherein the control of the vehicle relative to the road segment is based at least in part on the plurality of features satisfying the threshold number of features; and providing the map of the road segment and the predetermined scenarios determined for the road segment for application to a fleet of vehicles.

12. The system of claim 11, wherein extracting the plurality of features describing the road segment from the sensor data further causes the system to perform:

determining map features describing the road segment from the sensor data;

determining static objects detected on or along the road segment from the sensor data; and determining dynamic objects detected on or along the road segment from the sensor data.

13. The system of claim 12, wherein the map features include at least one of: a road segment length, a road segment quality, a roadway type, information describing traffic lanes in the road segment, information describing a presence of one or more bike lanes, information describing a presence of one or more crosswalks, and a zone in which the road segment is geographically located.

14. The system of claim 11, wherein the predetermined scenarios for the road segment are determined by a machine learning model.

15. The system of claim 11, wherein the instructions further cause the system to perform:
providing information describing the map and the at least one scenario to a transportation management system, wherein the transportation management system applies the information when routing the fleet of vehicles that offer transportation services.

16. A non-transitory computer-readable storage medium including instructions that, when executed by at least one processor of a computing system, cause the computing system to perform:
determining sensor data captured by at least one sensor of a vehicle while navigating a road segment that is unmapped;
extracting a plurality of features describing the road segment that is unmapped from the sensor data;
generating a map of the road segment based at least in part on (i) the sensor data captured by the at least one sensor of the vehicle and (ii) the plurality of features describing the road segment extracted from the sensor data, wherein the generated map includes at least one label that identifies at least one of the plurality of features extracted from the sensor data captured by the at least one sensor of the vehicle while navigating the road segment;
determining predetermined scenarios for the road segment based at least in part on the plurality of features describing the road segment;
subsequent to generating the map of the road segment, determining a control of the vehicle using at least one scenario of the predetermined scenarios determined based at least in part on (i) the map being generated of the road segment and (ii) a determination that the plurality of features describing the road segment extracted from the sensor data that indicate a presence of a dynamic object, a static object, and an interaction between the dynamic object and the static object at the road segment satisfy a threshold number of features associated with the at least one scenario of the predetermined scenarios, wherein the control of the vehicle relative to the road segment is based at least in part on the plurality of features satisfying the threshold number of features; and
providing the map of the road segment and the predetermined scenarios determined for the road segment for application to a fleet of vehicles.

17. The non-transitory computer-readable storage medium of claim 16, wherein extracting the plurality of features describing the road segment from the sensor data further causes the computing system to perform:
determining map features describing the road segment from the sensor data;
determining static objects detected on or along the road segment from the sensor data; and
determining dynamic objects detected on or along the road segment from the sensor data.

18. The non-transitory computer-readable storage medium of claim 17, wherein the map features include at least one of: a road segment length, a road segment quality, a roadway type, information describing traffic lanes in the road segment, information describing a presence of one or more bike lanes, information describing a presence of one or more crosswalks, and a zone in which the road segment is geographically located.

19. The non-transitory computer-readable storage medium of claim 16, wherein the predetermined scenarios for the road segment are determined by a machine learning model.

20. The non-transitory computer-readable storage medium of claim 16, wherein the instructions further cause the computing system to perform:
providing information describing the map and the at least one scenario to a transportation management system, wherein the transportation management system applies the information when routing the fleet of vehicles that offer transportation services.

* * * * *